US005083281A

United States Patent [19]

[11] Patent Number: 5,083,281

[45] Date of Patent: * Jan. 21, 1992

Rabindran et al.

[54] INSERTION MACHINE WITH SPEED OPTIMIZATION

[75] Inventors: K. George Rabindran, Morton Grove; David Filicicchia, Schaumburg; Kenneth L. Guenther, Park Ridge, all of Ill.

[73] Assignee: Bell & Howell Phillipsburg Co., Allentown, Pa.

[ * ] Notice: The portion of the term of this patent subsequent to Jan. 22, 2008 has been disclaimed.

[21] Appl. No.: 643,268

[22] Filed: Jan. 22, 1991

Related U.S. Application Data

[63] Continuation of Ser. No. 350,856, May 12, 1989, Pat. No. 4,987,547.

[51] Int. Cl.[5] .......... G06F 15/46

[52] U.S. Cl. .......... 364/478; 53/55; 270/58; 364/148

[58] Field of Search .......... 364/148, 478, 464.02, 364/471, 166; 270/53-58; 271/258, 259, 3.1, 4, 2, 3; 53/52, 460, 467, 266 A, 55; 377/15, 16

[56] References Cited

U.S. PATENT DOCUMENTS

| | | | |
|---|---|---|---|
| 4,142,238 | 2/1979 | Brandt et al. | 377/16 X |
| 4,506,339 | 3/1985 | Kuhnlein | 377/15 X |
| 4,577,848 | 3/1986 | Hams | 53/266 A |
| 4,634,107 | 1/1987 | Vandersyde et al. | 270/58 X |
| 4,734,865 | 3/1988 | Scullion et al. | 364/478 |
| 4,865,304 | 9/1989 | Vandersyde et al. | 53/266 A X |
| 4,903,456 | 2/1990 | Meur | 53/266 A X |
| 4,987,547 | 1/1991 | Rabindram et al. | 364/478 |

*Primary Examiner*—Joseph Ruggiero

*Attorney, Agent, or Firm*—Griffin, Branigan & Butler

[57] ABSTRACT

A speed optimization circuit (140) is employed by an insertion machine to result in a greater actual throughput of successfully enveloped sets of documents. The speed optimization circuit (140) includes a microcontroller (142) which determines whether the machine cycling speed should be changed and which generates a signal for application to a speed adjustment servomechanism (136) for automatically changing the machine cycling speed in accordance with the determination.

7 Claims, 14 Drawing Sheets

ICM7170
U2
154
5082-7340
MSD
LSD
U7
160
162
158
DIAGNOSTIC DISPLAY
74LS32
U9A
164
B1
3.0 V
244
Y2
32.768kHz
242
C3
18pF
240
C4
5-35pF
238
R1
4700
236
+5V
170
172
174
178
180
190
192
194
195
196
198
220
222
234

INSERTION MACHINE WITH SPEED OPTIMIZATION

This application is a continuation of U.S. patent application Ser. No. 07/350,856, filed May 12, 1989, now U.S. Pat. No. 4,987,547.

BACKGROUND OF THE INVENTION

I. Field of the Invention

This invention pertains to collating machines of the type which are operable as insertion machines, and to a method for operating such machines.

II. Prior Art and other Considerations

For several decades now collating machines have been utilized by commercial establishments for the preparation of printed matter for postal purposes. An early collating machine operated as an insertion machine is described in U.S. Pat. No. 2,325,455 to A. H. Williams which is incorporated herein by reference.

In conventional collating machines, an insert track is indexed past a series of processing stations in timed relation to a machine cycle. In most such machines the first such processing station positioned along the insert track is generally a first or control insert station which comprises feeder means for feeding documents onto the insert track. The insert track is indexed past further stations at a rate approximating one station per machine cycle.

The document(s) deposited on the insert track from the first insert station is associated with a particular customer and typically bears a control indicia, such as a bar code printed thereon which, when read, indicates with reference to the particular customer which further insert stations are to be actuated to feed one or more documents. As a particular customer's indicia-bearing document is indexed along the insert track, each insert station has an opportunity to feed (subject to operator control input and in accordance with the read control indicia) whatever document(s) stored thereat are applicable to the particular customer.

After all applicable inserts for a particular customer have been associated together as a group on the insert track, the associated documents are placed in an appropriate package at a packaging station. For collating machines which serve as insertion machines the packaging station is an inserting or stuffing station whereat the associated documents are stuffed into an awaiting envelope. Further operations such as envelope sealing, envelope diverting, and/or zip code grouping occur yet downstream in accordance with some embodiments of insertion machines. In some collating machines a wrapper or the like is formed about or envelopes the associated documents at the packaging station.

The actual throughput of an inserting machine, defined as the number of stuffed envelopes delivered from the machine per hour, depends largely on two factors: (1) the cycling speed of the machine; and, (2) the time lost due to the machine stoppages caused by jams and other errors.

The first factor is under the direct control of the operator. But the second factor depends on several aspects such as material characteristics, operator skill level, machine adjustments, and the like. For example, some insert documents may be of a particular stock that is not easily feedable from an insert feeder station.

The second factor of lost time also tends to increase with increasing cycling speed. For a given job-machine-operator-environment combination, as the cycling speed is increased from a low value, the throughput will increase as long as the effect of the time lost due to errors is more than compensated by the increase in cycling speed. But at some point the effect of the increasing time lost due to errors becomes overwhelming. Beyond this point the throughput begins to decrease with further increases in cycling speed.

Traditionally, the experienced operator develops a "feel" for this optimum cycling speed, which guides him to set the appropriate speed. More sophisticated prior art insertion machines have provided statistical indications of a variety of insertion machine monitored operations, including such counts as the average number of documents being fed from a control station; the number of envelopes completed per calendar hour; the number of envelopes completed per actual run hour; the number and type of machine stops; the actual machine run and idle times; and, the average machine cycle speed per hour.

These statistics provided by the more sophisticated machines, particularly the average machine cycle speed and the average number of documents per customer being fed from a control station, help an operator to fine tune his "feel" for an optimum cycling speed as set forth in U.S. Pat. No. 4,734,865 entitled "Insertion Machine with Audit Trail and Command Protocol", which is incorporated herein by reference. Nevertheless, even with such statistics this optimum speed decision is difficult to make, at best, for an operator.

In view of the foregoing, it is an object of the present invention to provide apparatus and method to positively guide the operator cf an insertion machine regarding the optimum cycling speed of the machine.

An advantage of the present invention is the provision of apparatus and method whereby the aggregate effect of a plurality of dynamic conditions, including cycling speed, material characteristics, machine adjustments, operator skill level, environmental conditions, are considered in providing an indication of optimum cycling speed for an insertion machine.

A further advantage of the present invention is the provision of apparatus and method for automatically setting machine cycling speed for maximum throughput under current dynamic conditions.

SUMMARY

A speed optimization circuit is employed by an insertion machine to result in a greater actual throughput of successfully enveloped sets of documents. The speed optimization circuit includes a microcontroller which determines whether the machine cycling speed should be changed and which generates a signal for application to a speed adjustment servomechanism for automatically changing cycling speed in accordance with the determination.

In performing its determination the microcontroller executes a program MAIN_LOOP and a plurality of procedures, some of which are called by the program MAIN_LOOP and other of which are executed as the result of interrupts. Means are provided for user input of values to establish both a time interval (INTERVAL_LENGTH) over which the performance of the machine is to be evaluated and a weighting factor (K_FACTOR) which weights information obtained with respect to the most recent interval relative to information accumulatively averaged over preceding time intervals.

The microcontroller of the speed optimization circuits monitors both the machine cycle speed and the number of sets of documents successfully enveloped for a unit of time. Using these monitored quantities, the microcontroller develops a new forecast (NEW_FORECAST) of the projected number of sets of documents the insertion machine is expected to successfully envelope. The new forecast is obtained by averaging, in accordance with the weighting factor K_FACTOR, (1) the number of sets of documents the machine can be expected to successfully envelope during a unit of time and (2) a previous forecast (PREV_FORECAST). The previous forecast is the accumulatively averaged number of sets successfully enveloped for a unit of time during previous intervals. The microcontroller further determines a percentage productivity index (PPI) by dividing the new forecast by the actual machine cycle speed and represents the actual machine cycle speed (SPEED) as a percentage value (POS) of a maximum rated machine cycle speed (MAX_SPEED). The microcontroller compares PPI with POS to determine whether the actual machine cycling speed should be changed to result in a greater actual throughput of successfully enveloped sets of documents.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
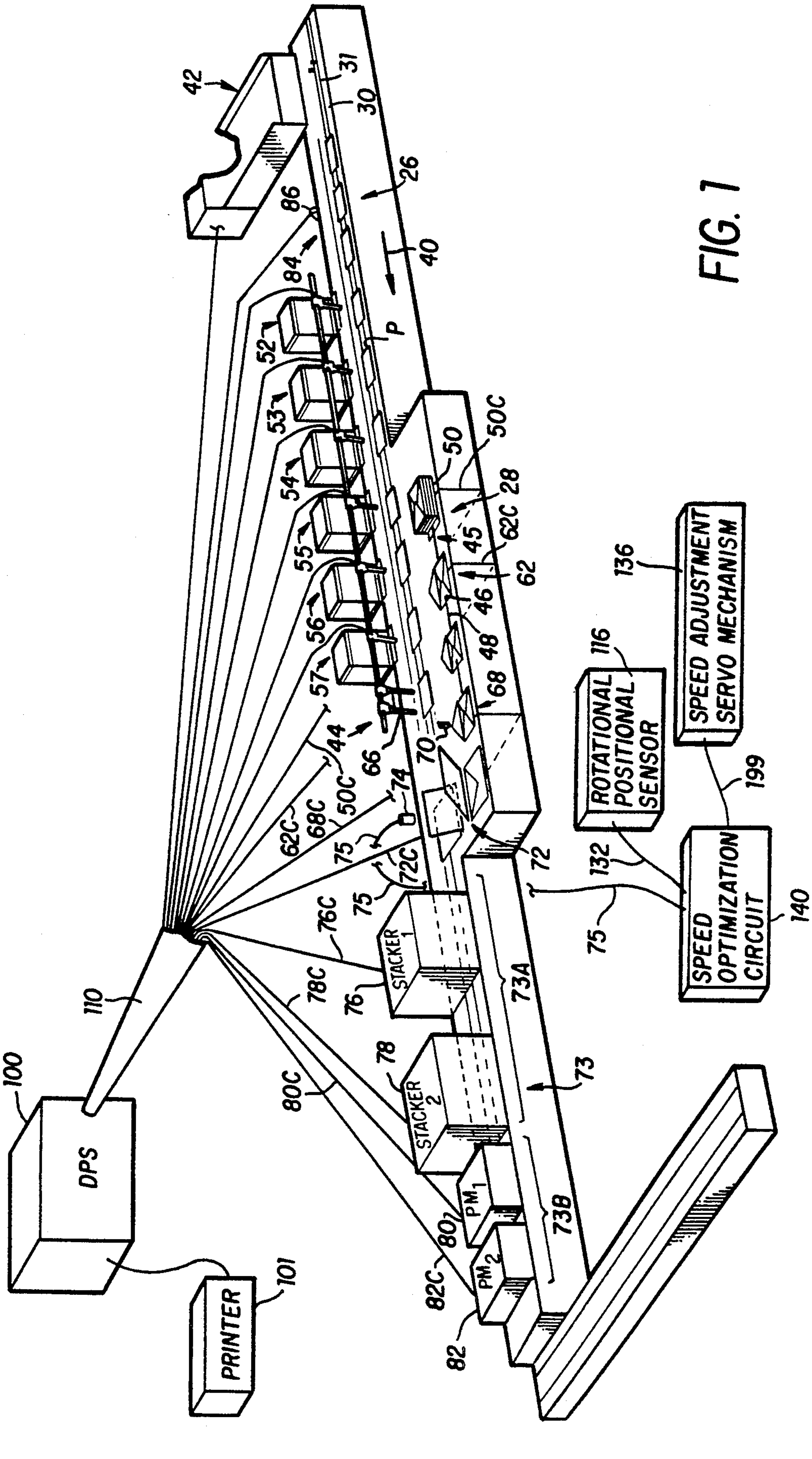
FIG. 1 is a perspective view of an insertion machine according to an embodiment of the invention.

FIG. 1 illustrates an insertion machine according to an embodiment of the invention. The embodiment of FIG. 1 comprises a back table portion 26 and a front table portion 28. The back table portion 26 includes an essentially linearly-extending insert track 30 which extends along a series of insert processing stations. The insert track 30 has sets of pusher pins formed on an indexing chain 31 whereby the insert track 30 conveys groups of documents deposited thereon in the direction of arrow 40 from an upstream-most insert station 42 to an insertion or envelope stuffing station 44.

The insert track 30 is indexed once per machine cycle in a manner well known in the prior art. In this respect, it is understood that the entire insertion machine is driven by an unillustrated motor. The motor is coupled both to a continuously rotating main timing shaft and to an intermittently rotating shaft. One full rotation (i.e. 360°) of the continuously rotating main timing shaft is referred to as a machine cycle. The indexing chain 31 is suitably connected to the intermittently rotating shaft by means well known to those skilled in the art whereby the chain 31 is moved during a portion of the machine cycle. In the embodiment described herein, the chain is essentially stationary through 0 to 130 degrees of the machine cycle (DMC) and moves essentially from 180 DMC to 360 DMC for incrementally advancing documents. It should be understood, however, that the particular degree of machine cycle at which chain 31 moves differs in some embodiments in view of various acceleration and deacceleration factors.

An envelope track 45 extends on the front table portion 28 in parallel manner along-side at least a portion of the insert track 30. The envelope track 45 has gripping jaws 46 formed on an indexing chain 48 whereby the envelope track 45 pulls an envelope deposited thereon also in the direction of arrow 40 away from an envelope feed processing station 50 and toward the insertion station 44. The front table portion 28 has associated therewith a continuously rotating timing shaft and an intermittently rotating shaft. In differing embodiments these two shafts associated with the front table portion 28 are coupled directly to the machine motor as described above or are mechanically linked to the continuously rotating main timing shaft and to the intermittently rotating shaft described above which operates chain 31. The intermittently rotating shaft associated with the front table portion 28 is used to incrementally advance the envelope indexing chain 48.

The series of insert processing stations includes the first or up-stream most insert station 42, as well as the second, third, fourth, fifth, sixth and seventh insert stations numbered 52 through 57, respectively. The first insert station 42 includes unillustrated reading means for reading indicia printed or otherwise formed on the customer's document. In the configuration of FIG. 1, the insert station 42, being the upstream-most reading station, serves as a control station. The insertion stations 52 through 57 are each standard gripper-type insert stations having oscillating gripper arm structure.

The processing stations located along the envelope track 45 include the afore-mentioned envelope feed processing station (also known as the envelope hopper) 50 and an envelope flap opener processing station 62. The envelope feed processing station 50 can, in differing embodiments, include any one of a plurality of types of envelope feeding mechanisms.

The insertion station 44 serves to stuff a group of related documents into an awaiting, opened envelope. The insertion station 44 includes conventional mechanical structure such as that illustrated in U.S. Pat. No. 3,965,644 to Stocker, for example. At insertion station 44 the back panel of an envelope is deflected slightly upwardly by one or more oscillating sucker cups positioned above the envelope. The group of documents is then ushered into the awaiting, thusly-opened envelope by oscillating pusher foot-type structure 66. The pusher foot 66 is mechanically linked to the main timing shaft of the insertion machine whereby the pusher foot 66 oscillate: to usher documents at the rate of once per machine cycle.

A sealing processing station 68 is situated immediately after the insertion station 44. The sealing station 68 comprises a wettable brush 70 which moistens a gummy seal-portion of a moving envelope flap prior to the flap being rotated back to its closed position.

Downstream from the sealing station 68 is an envelope turnover processing station 72 which, in a manner well known in the prior art, during four sequential machine cycles flips an envelope from envelope track 45 into a front panel-up orientation on an exit conveyor 73. The mechanical mechanism which performs the turnover or flip operation is mechanically linked to the machine timing shaft.

Proximate the envelope turnover processing station 68 is an envelope detector 74, such as a photocell, which detects the presence of an envelope. Each envelope passing proximate detector 74 corresponds to a successfully enveloped set of documents. With the passing of each envelope past detector 74, an appropriate signal is applined on line 75.

The exit conveyor of the embodiment of FIG. 1 comprises a first segment 73A and a second segment 73B. Segment 73A, which extends beneath two diversion processing stations such as stackers 76 and 78, is a chain-indexed conveyor driven in the manner of the insert track 30. Examples of diversion stackers of the type shown in FIG. 1 are described in U.S. Pat. No. 3,652,828 to Sather et al. Segment 73A discharges stuffed envelopes onto segment 73B. Segment 73B is a continuously running conveyor which extends along two postage meter processing stations 80 and 82.

An intrack detector processing station 84 is positioned along the insert track 30 to monitor for the presence of groups of documents on the insert track 30. The intrack detector 84 includes a conventional presence-sensing detector, such as photocell 86.

A data processing system 100 comprises a processor means which coordinates the processing stations of the insertion machine on the basis of inputs and outputs and internally programmed instructions. A printer 101 is connected to the DPS 100 through a conventional serial interface port such as a UART.

Various processing stations are connected by electrical leads to the interrupt chips, input chips, and output chips comprising the DPS 100. For illustration convenience the electrical leads connecting the various processing stations to the DPS 10C are shown as a series of cables labeled "XC" wherein X corresponds to the reference numerals designating the particular processing station. The cables are shown as merging into a larger conduit cable 110 as they enter the DPS 100.

Figure 2B:
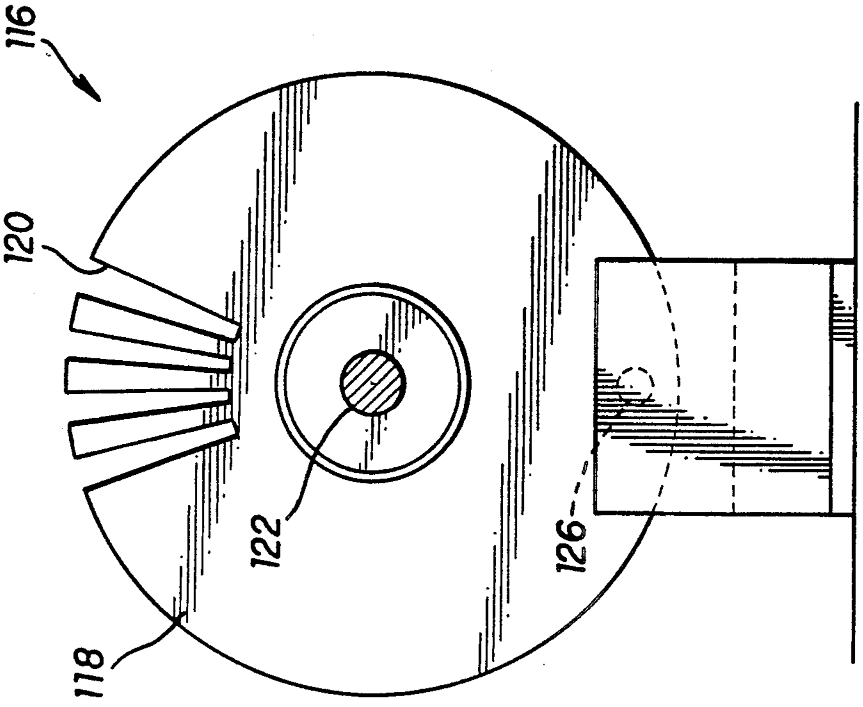
FIGS. 2A and 2B are side and front views, respectively, of machine cycle monitoring means according to an embodiment of the invention.
Figure 2A:
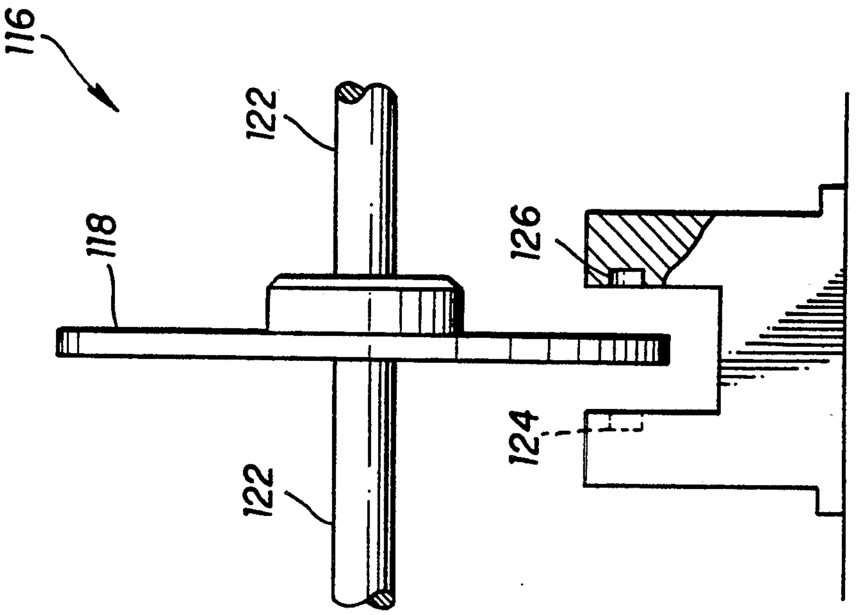

As shown in FIGS. 2A and 2B, a rotational position sensor 116 includes a rotatable disc 118 which has sixty four circumferential slits 120 thereon. The rotable disc 118 is mounted on the main timing shaft 122 of the insertion machine so that slit 120 permits the passage of light from a source 124 to a detector 126 sixty four times per machine cycle in a manner to create a train of timing pulses on line 132. A full revolution of disc 118 indicates the completion of one machine cycle.

The insertion machine includes a speed adjustment mechanism, such as a speed adjustment potentiometer (not illustrated). The speed adjustment potentiometer is used to adjust the cycling speed of the machine (i.e., the number of machine cycles completed by the machine per hour) through a range of from zero to the maximum rated cycling speed for the machine. Heretofore, a device such as the speed adjustment potentiometer has been manually adjusted to change the machine cycling speed.

The insertion machine of the present invention further includes means for automatically adjusting the speed of the insertion machine, including a speed adjustment servomechanism 136. The speed adjustment servomechanism 136 has an output shaft coupled to the speed adjustment potentiometer to control the degree of rotation of the speed adjustment 35 potentiometer. To this end, the speed adjustment servomechanism 136 is adapted to receive a high-going pulsed signal with the width of the pulse being indicative of the desired orientation of the output shaft of the servomechanism 136. In the illustrated embodiment, the orientation of the output shaft of the servomechanism 136 ranges from −90 degrees to +90 degrees. If the width of the pulse is 0.5 milliseconds, the orientation of the output shaft of the servomechanism 136 will be −90 degrees. If the pulse width is 1.6 milliseconds, the orientation of the output shaft of the servomechanism 136 will be 0 degrees. If the pulse width is 2.5 milliseconds, the orientation of the output shaft of the servomechanism 136 will be +90 degrees. Thus, any orientation of the output shaft through the range of from −90 degrees to +90 degrees can be achieved by applying a signal having an appropriate pulse width.

Figure 3:
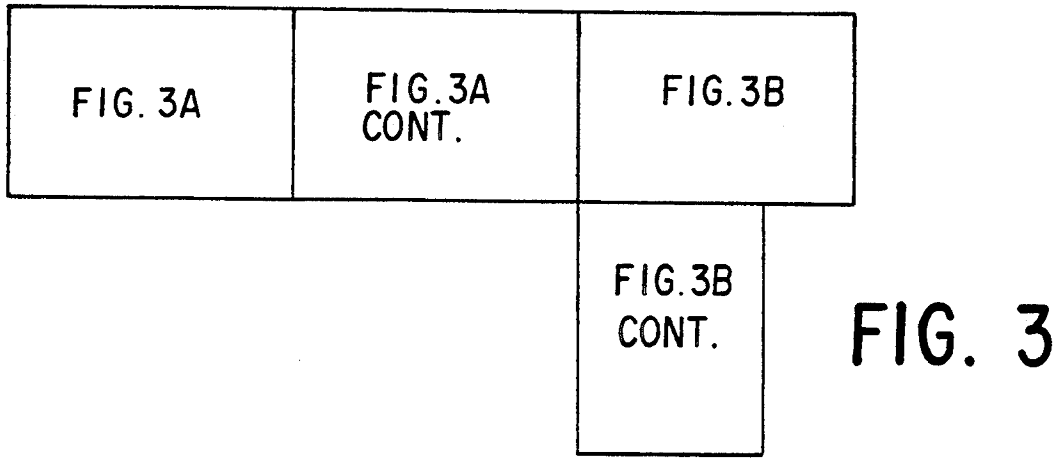
FIG. 3 is a schematic diagram showing the relationship of FIGS. 3A and 3B.

The insertion machine of the invention includes a speed optimization circuit 140 as shown in FIG. 3. The circuit 140 includes a microcontroller 142; a timer 144; an octal transparent latch 146; an 8K×8 EP ROM 148; three HEX Schmidt trigger inverters 148, 150, and 152; a real time clock 154; a programmable peripheral interface 156; a decimal digit display indicator 158 (comprising a most significant digit chip 160 and at least significant digit chip 162); an OR gate 164; and LCD display 166; and, switches 168 and 169.

The microcontroller 142 is an eight bit controller from the 8051 family, and internally includes a central processing unit (which further includes a arithmetic logic unit); an oscillator interface; 128 bytes of data memory; two 16-bit counters; a 64K-byte bus expansion control; a programmable I/O unit; and a programmable serial port. The microcontroller includes two programmable, particularly Timers T0 and T1. Timer T0 is configured to use the internal oscillator to generate a pulse width modulated signal at pin 5. Timer T1 has connection at pin 15 and is configured in the illustrated embodiment to function as a counter.

The line 132 from the rotational position sensor 116 is connected to input pin 15 of the microcontroller 142. Pin 15 receives pulses on line 32 so that one of the two internal counters and the microcontroller 142 can count the pulses as an indication of the passage of light through slits 120 of the disc 118.

The line 75 from the completed envelope counter 74 counted to pin 13 (an active low interrupt pin) of the microcontroller 142. Pin 13 receives an interrupt on line 75 to apprise the microcontroller 142 that a set of documents has been successfully enveloped.

An eight bit data bus 170 connects pins 32–39 of the microcontroller 142 with data input pins 8, 13, 7, 14, 4, 17, 3, and 8 of the octal transparent latch 146, with pins 22, 21, 20, 19, 18, 17, 16, and 15 of the programmable real time clock 154; with pins 27–34 of the programmable peripheral interface 156; and, with data pins 19, 18, 17, 16, 15, 13, 12, and 11 of EPROM 148. The four lower order lines in the data bus 170 are included in a four-bit bus 172 that is connected to pins 8, 1, 2, and 3 of diagnostic display chip 162, while the four higher order lines included in bus 170 are further included in a four bit bus 174 that is connected to pins 8, 1, 2, and 3 1 of the diagnostic display chip 160.

Data output pins 9, 12, 6, 5, 16, 2, and 19 of the octal transparent latch 146 are connected by an 8-bit bus 176 to address pin 3–10 of the EPROM 148. A 5-bit address bus 178 connects pins 6–10 of the EPROM 148 with pins 4–8 of the programmable real time clock 154. The two low lower order lines in bus 178 are included in a 2-bit bus 180 that is connected to address pins 8 and 9 of the programmable peripheral interface 156.

Five output address pins 21–25 of the microcontroller 142 are connected by a 5-bit address bus 182 to pins, 25, 24, 21, 23, and 2 of the EPROM 148. Output address pins 26–28 of the microcontroller 142 are connected by line 184, 186, and 188, respectively to input terminals of the hex Schmidt trigger inverters 148, 150, and 152, respectively. An output terminal of the inverter 148 is connected via line 190 to pin 3 of the programmable real time clock 154. An output terminal of the invertor 150 is connected via line 192 to pin 2 of the OR gate 164. An output terminal of the invertor 152 is connected by line 194 to pin 6 of the programmable peripheral interface 156.

Pin 5 of the microcontroller 142 is connected by line 199 to the speed adjustment servomechanism 136. Line 199 carries a pulse width modulated signal to the speed adjustment servomechanism 136.

Pins 1–3 of the microcontroller 142 are connected to pins 4 (register select), 5 (read/write) and 6 (enable) of the LCD display 166 by respective lines 195, 196, and 198.

Pins 18 and 19 of the microcontroller 142 have connected therebetween a crystal 200 (11.059 MHz). Pins 18 and 19 also are connected through separate 33 pF capacitors (capacitors 202 and 204), respectively, to ground. Pin 31 of the microcontroller 142 is also connected to ground.

Pin 9 of the microcontroller 142, also known as the reset pin, is connected to output pin 3 of the timer 144 and through a 4.7K resistor 206 to +5 volt potential. Pin 4 of the timer 144 (the reset pin) is also connected to +5 volt potential. A switch 208 is included in a voltage division network between +5 volts potential and ground. The voltage division network includes a 330 ohm resistor 210 and 10K resistor 212. Pin 2 and 6 of the timer 144 are connected both to a point between the resistors 210 and 212 and through a capacitance 214 (1 microFarad) to ground. A diode 216 is connected between +5 volt potential and the resister 210.

Pins 9, 16, and 17 of the microcontroller 142 (which pins are respectively also known as the reset pins, active low write pins, an active low read pin) are connected by respective lines included in a control bus 220 to respective pins 35, 36, and 5 of the programmable peripheral interface 156. Pins 16 and 17 of the microcontroller 142 are connected through bus 220 and two-lead bus 222 to respective pins 1 and 24 of the programmable real time clock 154. The active low write line is also connected to input in 1 of the OR gate 164. An output terminal of the OR gate 164 is connected to chip enable pins (pins 5) of the display chips 160 and 162.

Pin 30 of the microcontroller 142 is connected by line 230 to pin 11 (latch enable) of the transparent octal latch 146. Pin 1 (active low output enable) of the octal transparent latch is connected to ground.

Pin 29 ($\overline{\text{PSEN}}$) of the microcontroller 142 is connected by a line 232 to pin 22 (active low output enable) of the EPROM 148. Pin 20 (active low chip enable) of EPROM 148 is connected to ground, while pins 1 (programming pulse voltage) and 27 (active low program) of the EPROM 148 are connected to +5 volts potential.

Pin 12 (active low interrupt) of the microcontroller 142 is connected by line 234 to both pins 12 (active low interrupt) of the programmable real time clock 154 and through a 4700 ohm resister 236 to +5 volts potential. Pin 2 (ALE) of the programmable real time clock 154 is also connected to +5 volts potential.

Pins 11 and 13 of the programmable real time clock 154 are connected to ground. Pins 9 and 10 of the programmable real time clock 154 are connected through adjustable capacitor 238 (3–35 picoFarads) and capacitor 240 (18 picoFarads), respectively, to +5 volts potential. A piezoelectric crystal 242 (32.768 kHz) is connected between pins 9 and 10 of the real time clock 154. Pin 23 of the programmable real time clock 154 is connected to +5 volts potential and to the positive terminal of a 3 volt battery 244. Pin 14 of the programmable real time clock 154 is connected to a negative terminal of the 3 volt battery 244.

Port A (pins 4,3,2,1, 40, 39, 38, and 37) of the programmable peripheral interface 156 is connected to pins 1–8, respectively, of the INTERVAL_LENGTH switch 168, and through respective 10K resistors to +5 volts potential. Port B (pins 18–25) of the programmable peripheral interface 156 is connected to pins 7–14 of the LCD display 166. Port C (pins 10–17) of the programmable peripheral interface 156 is connected to pins 1–8 of the K_FACTOR Switch 169, and through respective 10K resisters to +5 volts potentials.

OPERATION

Figure 10:
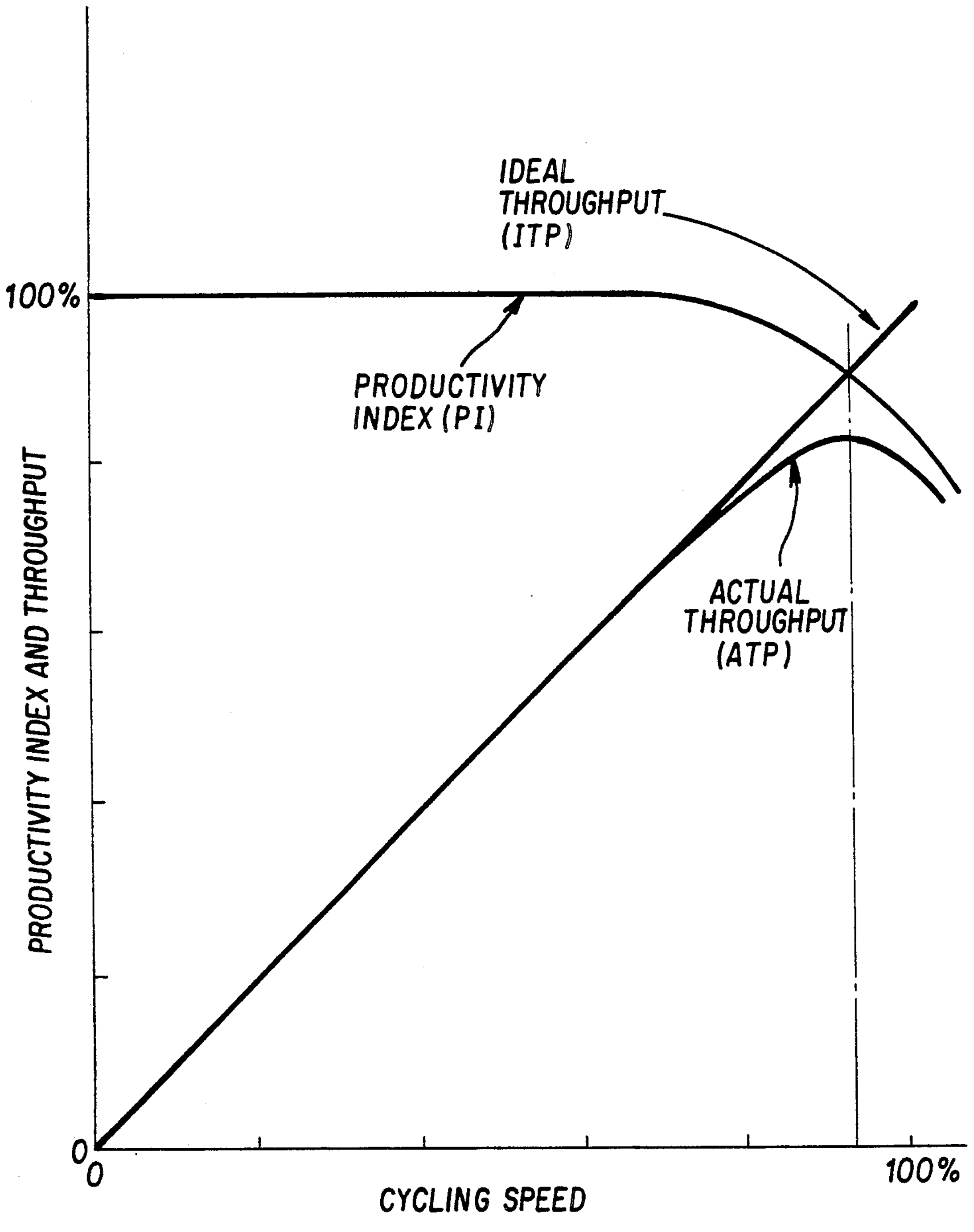

FIG. 10 facilitates an understanding of the operation of the speed optimization technique employed by the insertion machine of the present invention. Four definitions are utilized herein in conjunction with the discussion of FIG. 10 and the operation of the insertion machine of the present invention:

(1) Cycling Speed (CS)—The actual machine operating speed, in the number of cycles per hour, expressed as a percentage of the maximum rated operating speed.

(2) Ideal Throughput (ITP)—The number of stuffed envelopes that would be delivered per hour if the machine operated without any stops, expressed as a percentage of the maximum rated operating speed.

(3) Actual Throughput (ATP)—The actual number of stuffed envelopes per hour delivered by the machine, expressed as a percentage of the maximum rated operating speed.

(4) Percentage Productivity Index (PPI)—The actual number of stuffed envelopes per hour delivered by the machine, expressed as a percentage of the operating speed.

FIG. 10 shows the general Ideal Throughput or ITP curve (a straight line), a typical Productivity Index or PI curve, and the corresponding Actual Throughput or ATP curve, all three variables plotted against cycling Speed. As a result of optimization theory, the maximum ATP will occur at a cycling speed near the speed at which the ITP and PI curves intersect. Thus, the cycling speed at which the ITP and PI values are equal, is the approximate optimum speed under the given set of conditions.

For implementation of the above-described optimization scheme, it should be realized that the Ideal Throughput is numerically the same as the Cycling Speed (which can be readily measured). The Productivity Index, on the other hand, depends on the actual performance of the machine over an appropriate past period of time. This is computed by counting the actual number of stuffed envelopes delivered by the machine during a specified interval of time and using an exponential smoothing technique to combine the latest data with older data to arrive an appropriate PPI figure. The PPI figure is then compared with the Cycling Speed (which numerically represents ITP). If PPI is greater than CS, the operating speed can be further increased to increase Actual Throughput. On the other hand, if PPI is less than CS, the operating speed is too high and should be decreased to get increased Actual Throughput. The ensuing description of the operation of the insertion machine of the present invention details the implementation of the optimization of actual throughout in accordance with the foregoing.

The basic steps executed in connection with the insertion machine of the present invention are illustrated with reference to FIGS. 4 through 9. The steps of FIGS. 4-9 presuppose that the insertion machine and the speed optimization circuit 140 have both been powered up. Also, the operator must perform numerous preliminary tasks including the loading of appropriate documents into hoppers or the like associated with the various insert stations 52-57, as well as supplying envelopes to the envelope hopper 50.

Figure 8:
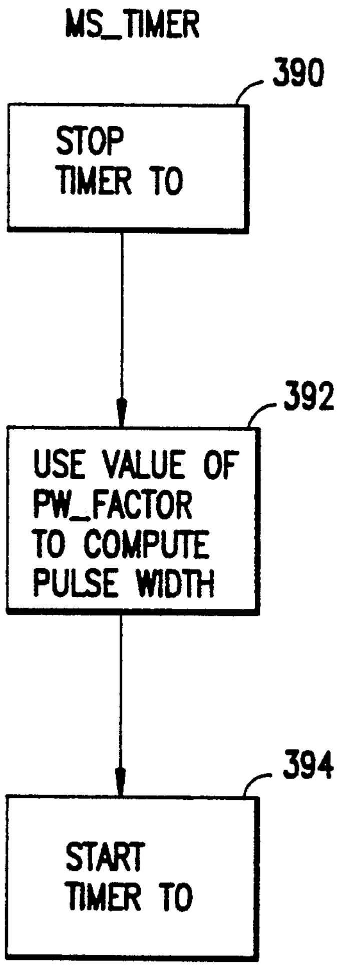
FIG. 8 is a schematic diagram depicting steps executed in a procedure MS_TIMER.
Figure 4B:
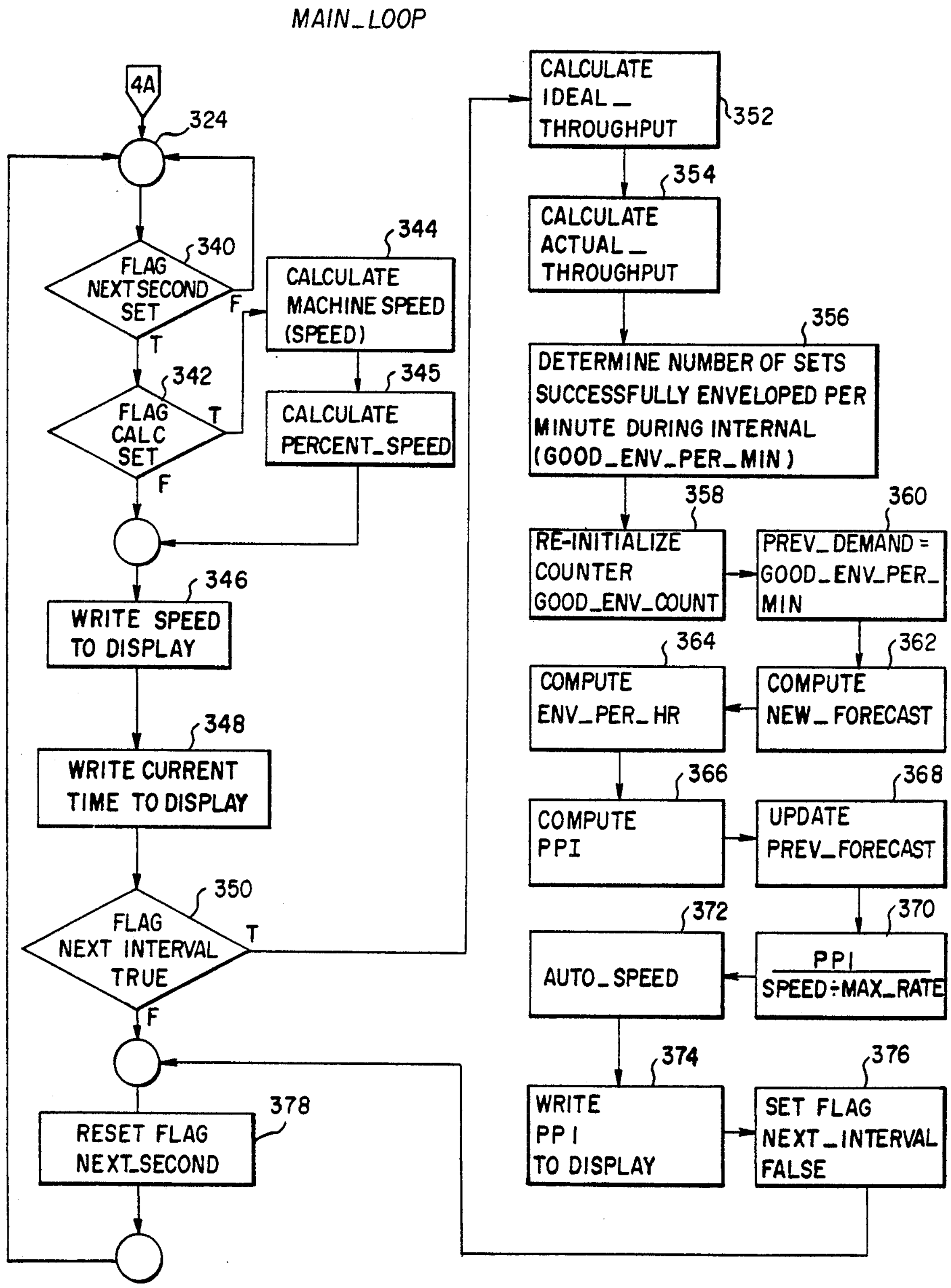
Figure 9:
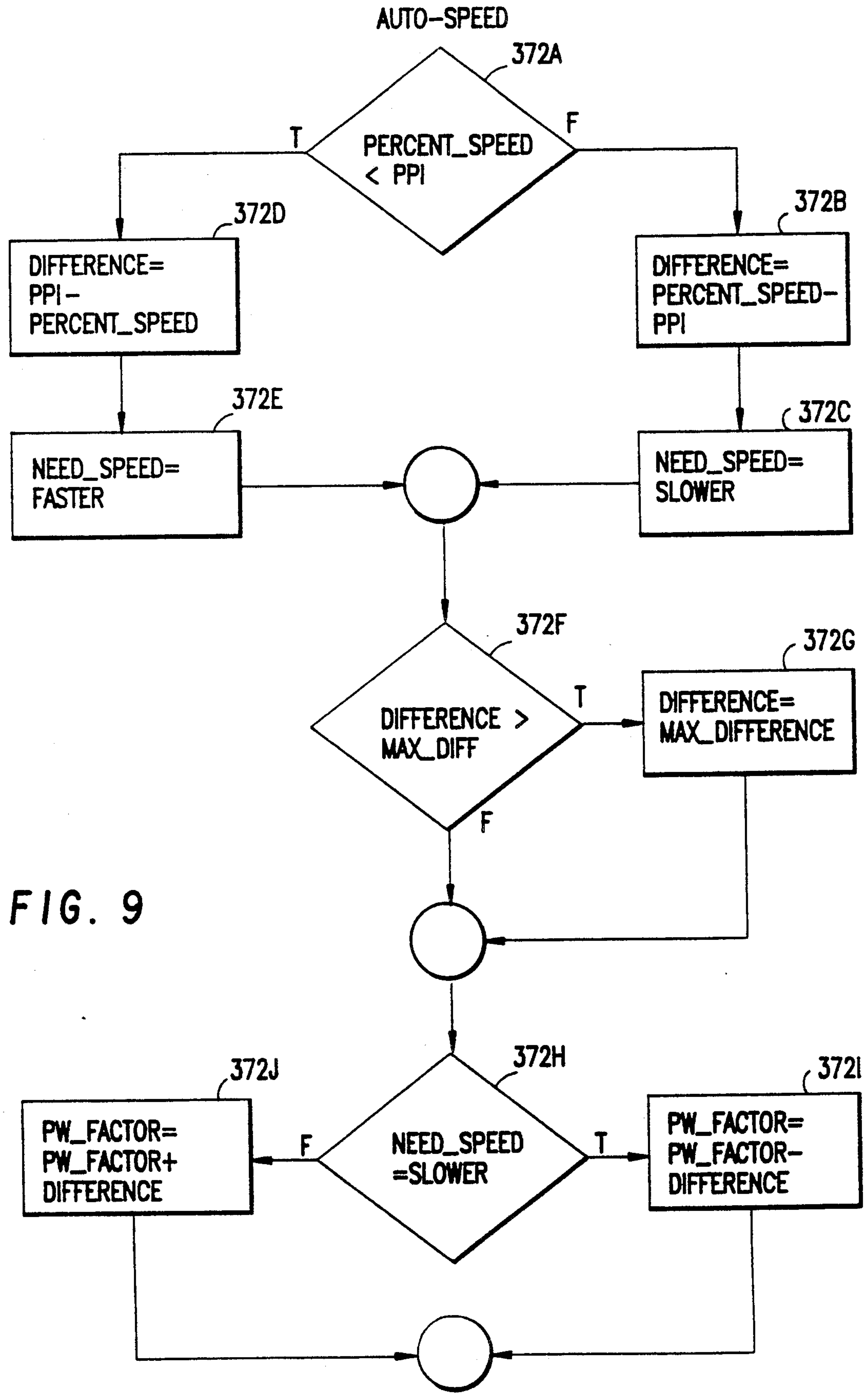
FIG. 9 is a schematic diagram depicting steps executed in a procedure AUTO_SPEED; and, FIG. 10 is a graph illustrating optimization theory upon which the insertion machine of the invention operates.

The program memory of the microcontroller 142 has stored therein a set of instructions which are executed by the microcontroller 142 of the speed optimization circuit 140. The set of instruction includes a program MAIN_LOOP and a plurality rf procedures. Certain steps conducted as a result of the execution of the program MAIN_LOOP are shown in conjunction with FIG. 4. As seen hereinafter, some of the steps depicted in FIG. 4 comprise a plurality of sub-steps which result from the execution of a corresponding procedure, such as the procedures HARDWARE_INT (FIG. 5); SOFT_INIT (FIG. 6); and AUTO_SPEED (FIG. 9). Two other procedures executed by the microcontroller 142, but not directly called by the program MAIN_LOOP, are the procedures RTC_INTERRUPT (FIG. 7) and MS_TIMER (FIG. 8).

The operator may change the setting of switch 168 (see FIG. 3) to change the duration of the time intervals which the performance of the insertion machine is to be evaluated. Likewise, the operator can change the setting of switch 169 to change the value of a weighing factor (known as the K_FACTOR). As seen hereinafter, the weighing factor is used for weighing information obtained with respect to a most-recent interval relative to information accumulatively averaged over proceeding time intervals. If the setting currently shown on the switches 168 and 169 for a previous job are satisfactory for the upcoming job, the operator need not change the setting for the switches 168 and 159. If the setting for switches 168 and 169 are to be changed, however, the operator can make those changes at any point during machine operation. Since it is most likely that such changes will be made prior to actual processing by the machine, FIG. 4 includes step 304 as changing the setting of switch 168 with regard to the time interval, and step 306 shows the charging of the setting of switch 169 with respect to the weighing factor.

Figure 4:
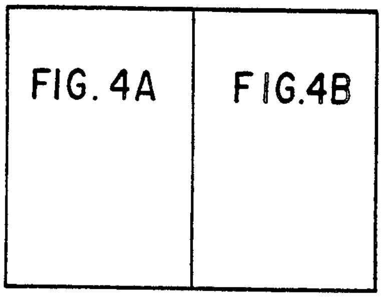
FIG. 4 is a schematic diagram showing the relationship of FIG. 4A and 4B.
Figure 3A:
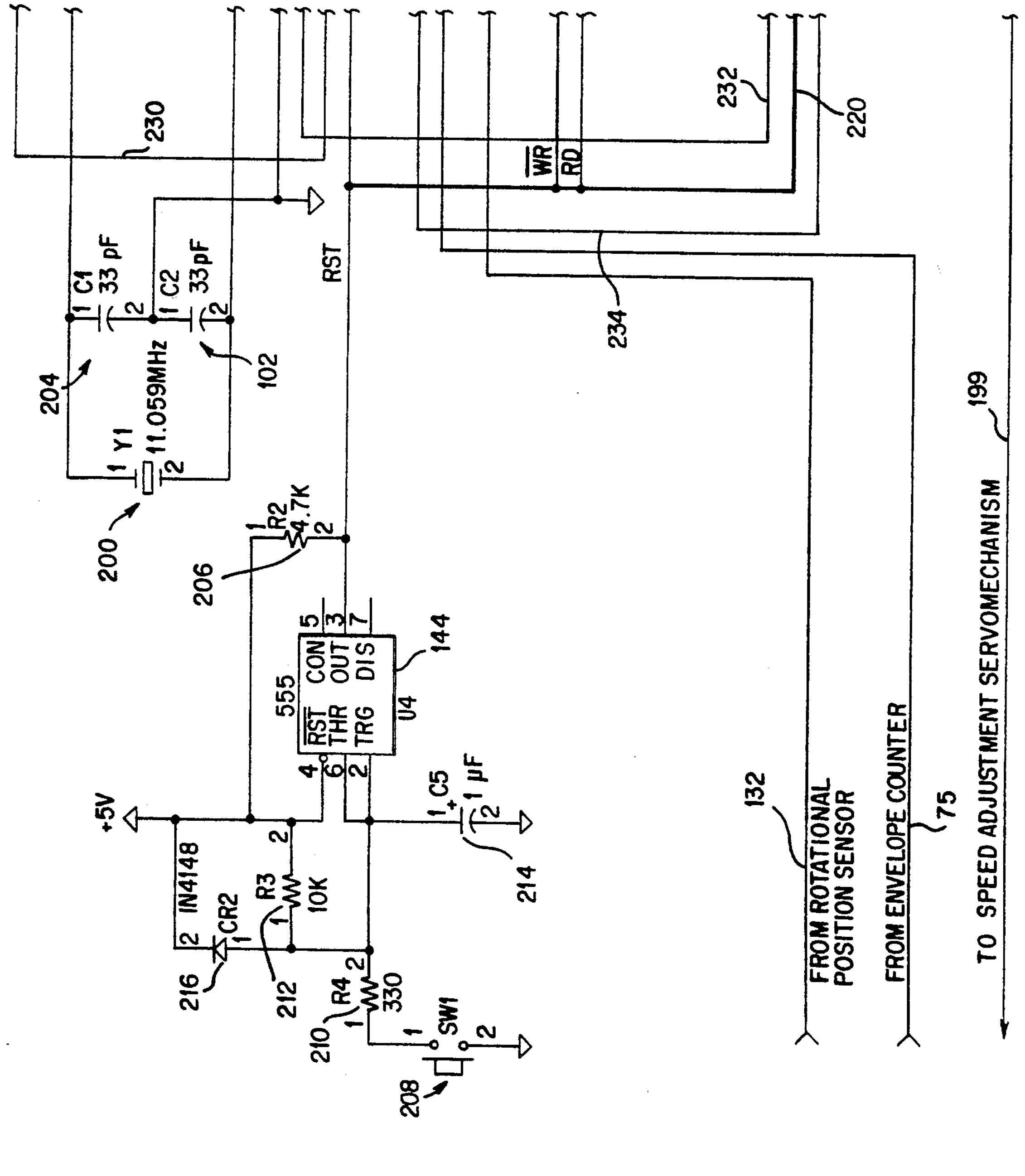
FIGS. 3A and 3B are schematic diagrams showing a speed optimization circuit according to an embodiment of the invention.
Figure 3A:
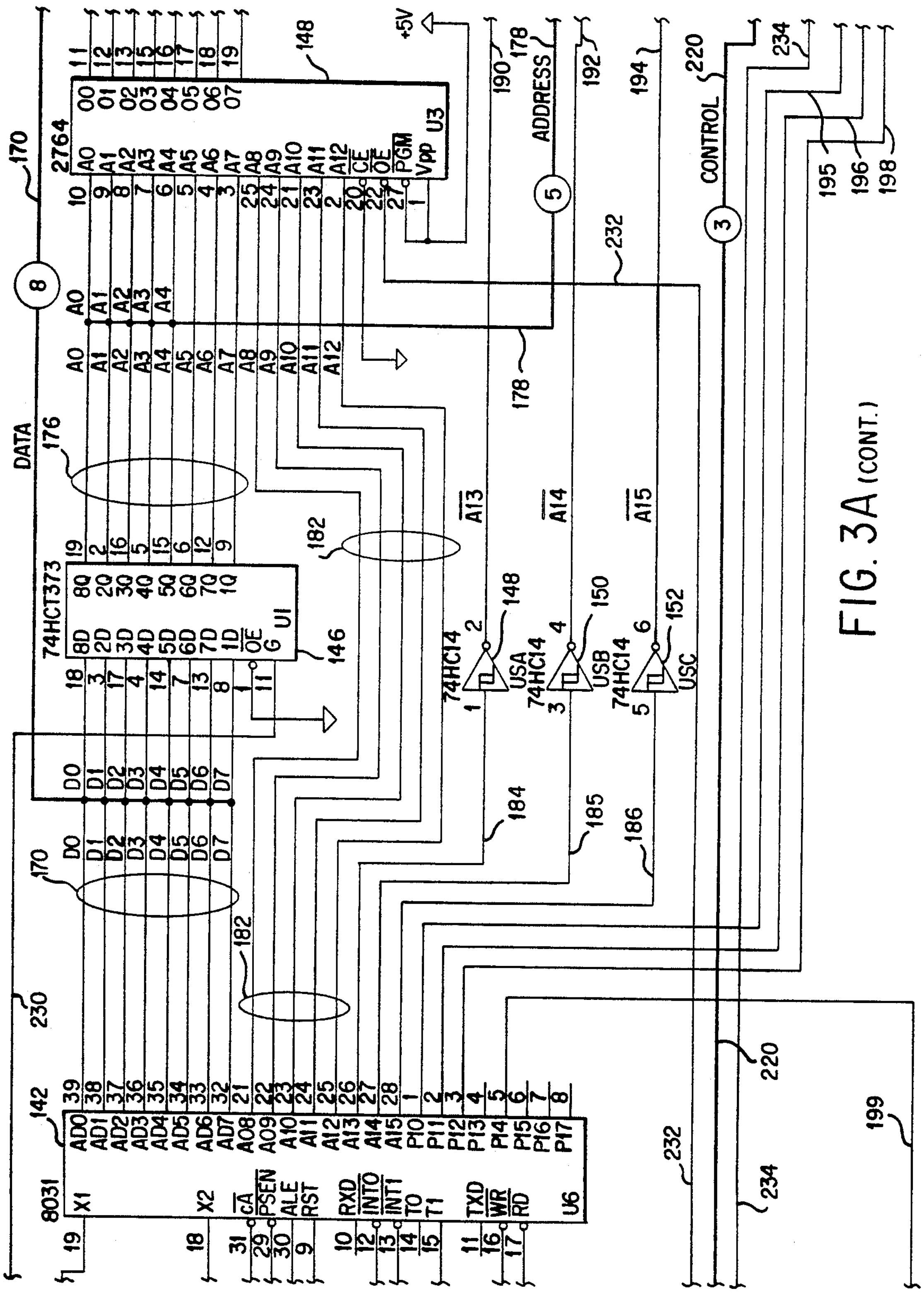
Figure 3B:
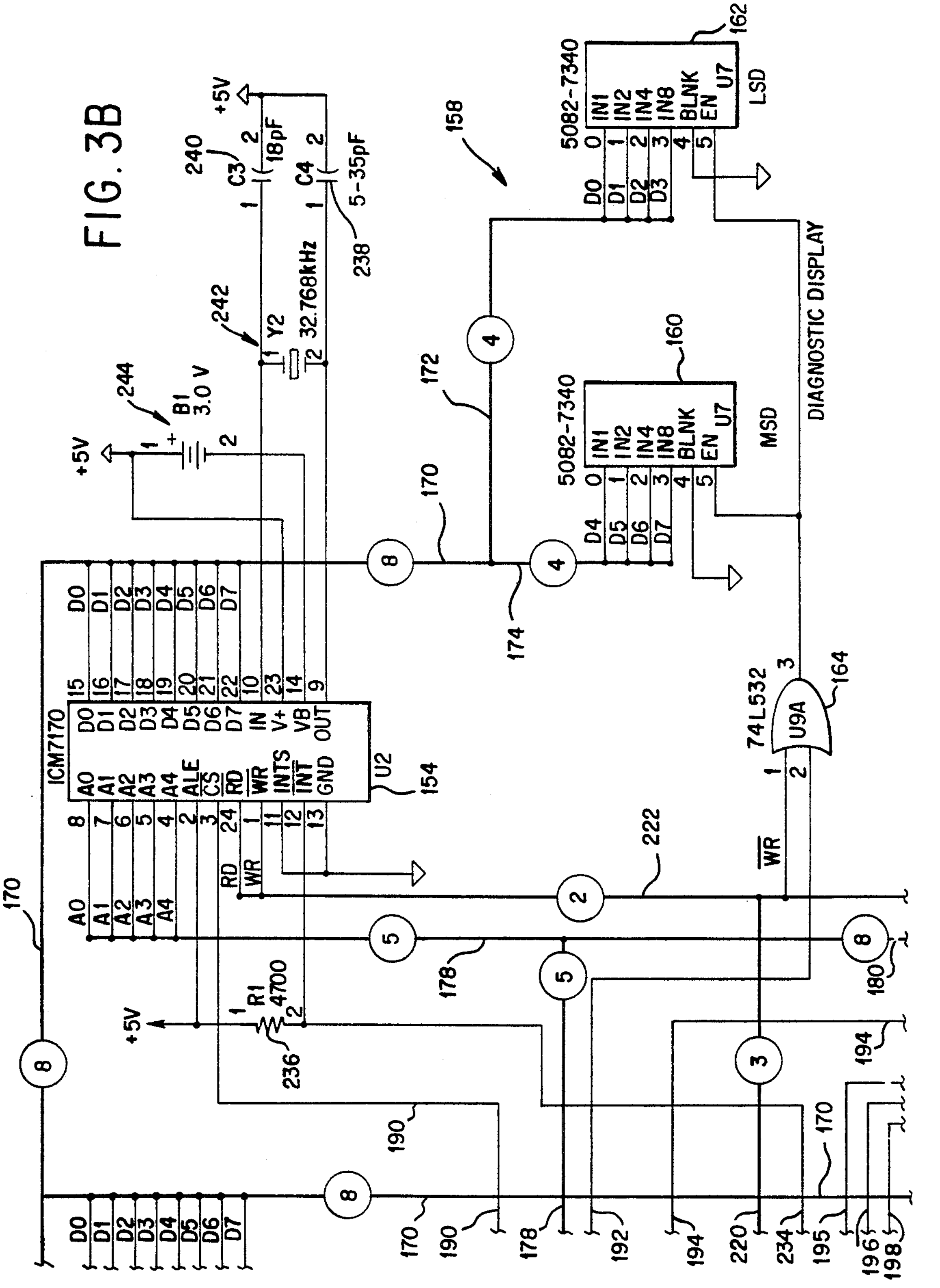
Figure 3B:
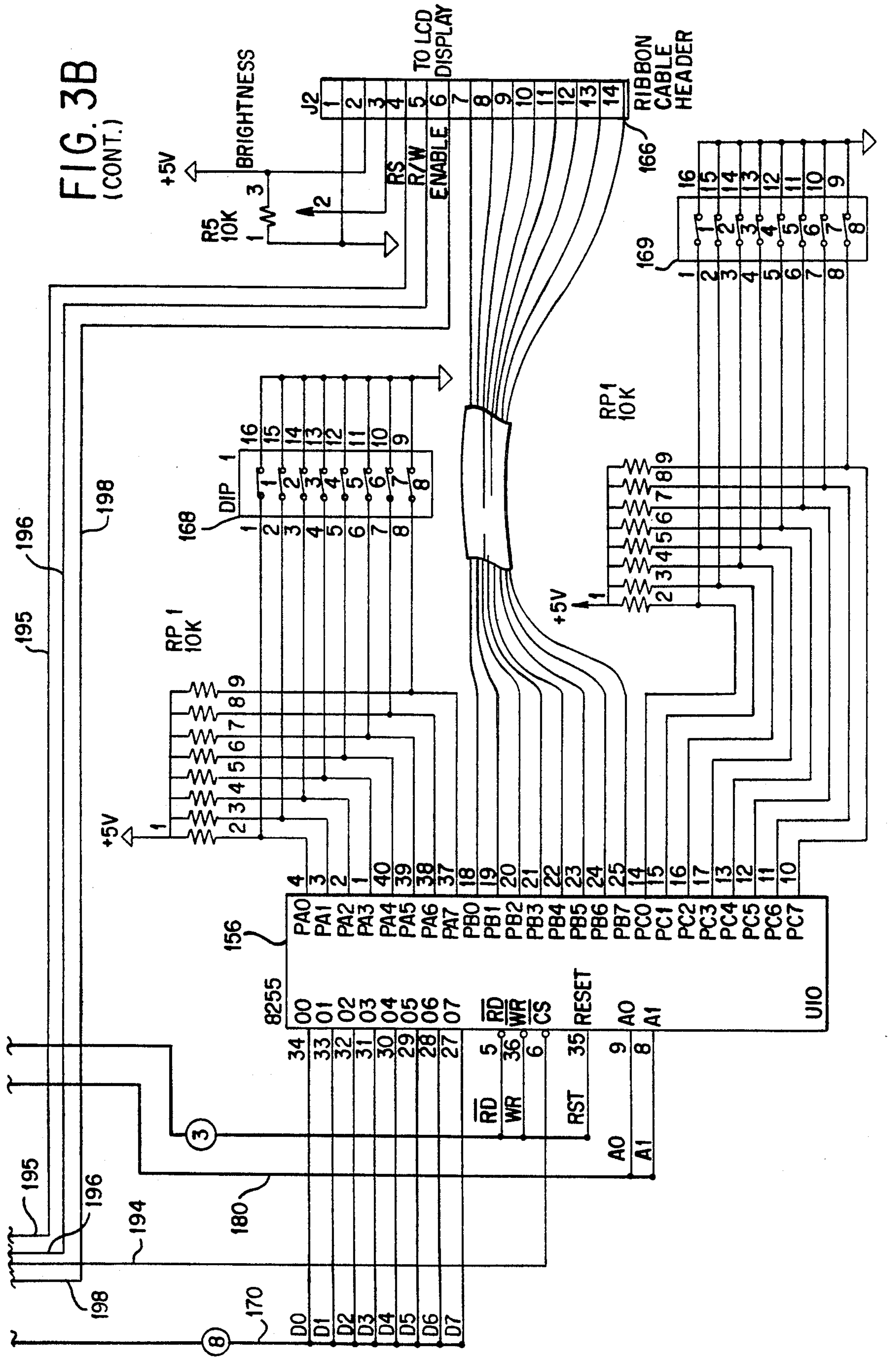
Figure 4A:
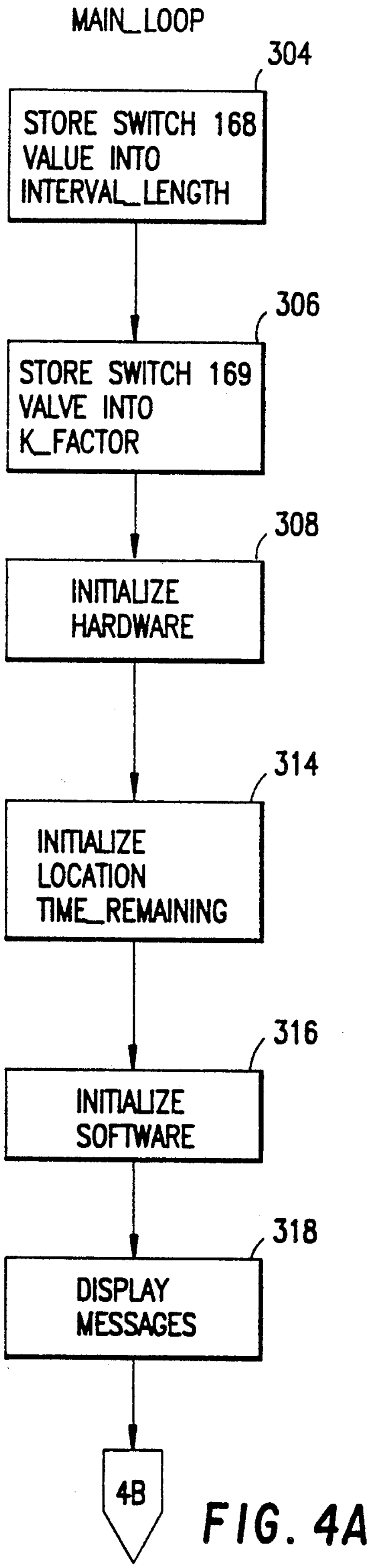
FIGS. 4A and 4B are schematic diagrams depicting steps executed in a program MAIN_LOOP.
Figure 5:
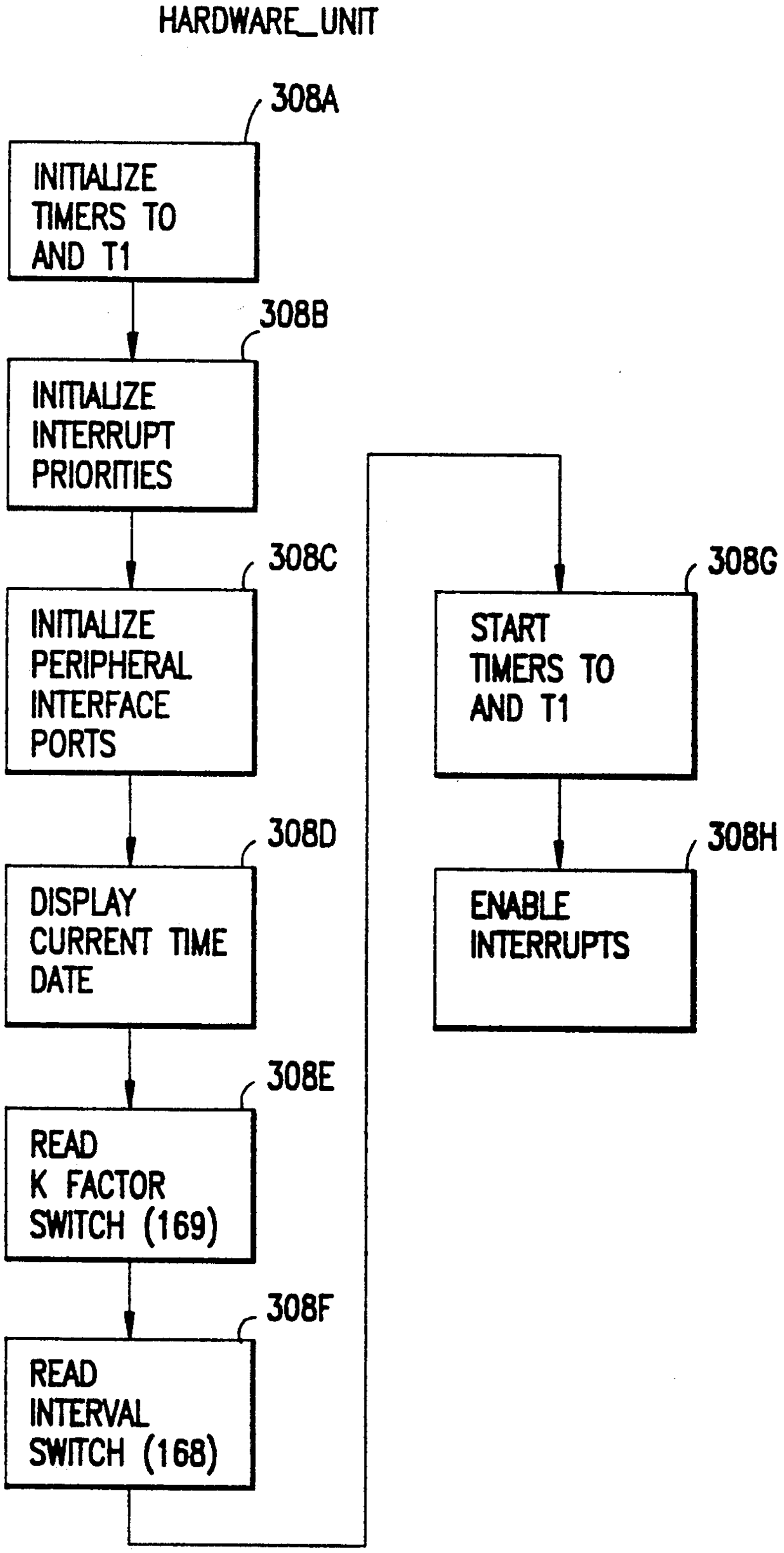
FIG. 5 is a schematic diagram depicting steps executed in a procedure HARDWARE_INIT.

Prior to the insertion machine operator having the opportunity to actually start the feeding of documents from the insertion machine, the microcontroller 142 of the speed optimization circuit 140 executes instructions resulting in the performance of at least steps 308 through 318 shown in FIG. 4. In the ensuing discussion, it is assumed that at a point between steps 324 and 376 the operator presses a "start" button to actually start the feeding of documents from the insertion machine. This assumption is made for the sake of simplification of the discussion. It is more likely, however, that pressing of the "start" button would occur subsequently to the first occurrence of step 318 and that steps 324 through 376 of FIG. 4 may be executed at a plurality of times with default values prior to the actual pressing of the "start" button.

At step 308 the hardware associated with the speed optimization circuit 140 is initialized by a call to the procedure HARDWARE_INIT. The sub-steps performed as a result of the execution of the procedure HARDWARE_INIT are illustrated in FIG. 5.

With reference now to FIG. 5 and the steps performed as a result of the execution of procedure HARDWARE_INIT, the timers of the microcontroller 142 are initialized at step 308A. In this respect, timer TO of the microcontroller 142 is set to have a 20 milli-second delay and set for a falling edge trigger interrupt. Timer TI of the microntroller 142 is operated as a 16-bit counter which is also set for a falling edge trigger interrupt.

At step 308B the interrupt priority for the microntroller 142 is established so that the timer TO interrupt has the highest priority. At step 308C the ports of the programmable peripheral interface 156 are initialized so that ports A and B are input ports while port B is an output port.

At step 308D various parameters, including the current time and the current date, are displayed on the display 166. The date and time information are obtained from the real time clock 154.

At step 308E and 308F the switches 169 and 168, respectively, are read. The setting of switch 169 reflects the weighing factor or K_FACTOR, while the setting of switch 168 reflects the setting established for the observatory time interval. Values indicative of these settings are stored in memory locations K_FACTOR and INTERVAL_LENGTH.

At step 308G the timers T0 and T1 of the microcontroller 142 are started. With timer T0 started, a pulse width modulated signal is applied on line 199 to the speed adjustment servomechanism 136. With timer T1 started, the timer T1 commences the counting of pulses of line 132 from the rotational position sensor 116. In this regard, it will be recalled that 64 pulses from the sensor 116 indicates the completion of one machine cycle.

At step 308H the interrupts to the microcontroller 142 are enabled. It will be recalled that INIT1 is connected by line 75 to the envelope detector 74, while the INIT0 is connected by line 234 to the programmable real time clock 154. Once per second the real time clock 154 generates a pulse on line 234 which is supplied to interrupt pin INIT0 of the microcontroller 142.

At step 314 the value in memory location TIME_REMAINING is initialized. As utilized herein, the contents of location TIME_REMAINING indicates the time left in the current observation interval. Upon initialization, the value in location TIME_REMAINING is set equal to the duration of an entire observation interval, which value has been read on switch 168 and stored at the location INTERVAL_LENGTH.

Figure 6:
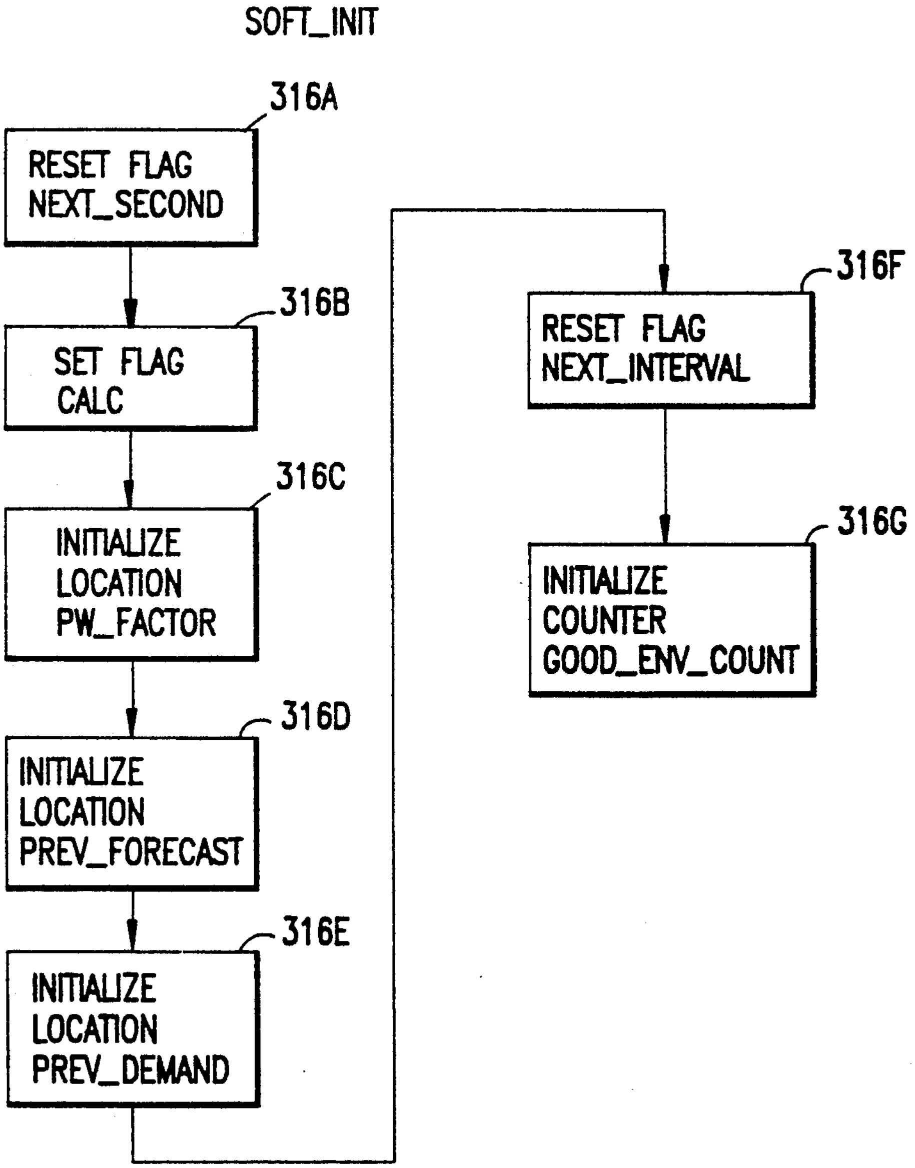
FIG. 6 is a schematic diagram depicting steps executed in a procedure SOFT_INIT.

Step 316 reflects a call to a procedure SOFTWARE_INIIT. Procedure SOFTWARE_INIT initializes various software variables. Steps performed as a result of the execution of procedure SOFTWARE INIT are shown in FIG. 6. At the first such step (step 316A), the flag NEXT_SECOND is reset. When set, the flag NEXT_SECOND indicates that the programmable real time clock 154 has just generated its once-per-second interrupt to pin 12 of the microcontroller 142.

At step 316B the flag CALC is set. As seen hereinafter, various calculations are enabled when the flag CALC is set.

At step 316C an initialization value is assigned to a location PW_FACTOR. The value in location PW_FACTOR determines the pulse width of the signal applied on line 199 to the servomechanism 136. When the value at location PW_FACTOR is zero, a pulse width of 0.5 milliseconds orients the output shaft of the servomechanism 136 at −90 degrees. When the value at location PW_FACTOR is 100, a pulse width of 2.5 milliseconds orients the output shaft of the servomechanism 136 at +90 degrees. In the illustrated embodiment the default value of location PW_FACTOR is set at 50.

At steps 316D and 316E the values in locations PREV_FORECAST and PREV_DEMAND are initialized to default values. The value in location PREV_FORECAST is used to store an accumulatively averaged number of sets successfully enveloped for a unit of time during previous intervals. The value of location PREV_DEMAND is utilized in the manner hereinafter indicated to obtain an updated value for a location NEW_FORECAST. At steps 316D and 316E the contents of the location PREV_FORECAST and PREV_DEMAND are both initialized to a default value of 117.

At step 316F the flag NEXT_INTERVAL is reset. The flag NEXT_INTERVAL is set whenever it is determined that a new observatory time interval has begun.

At step 316G a counter GOOD_ENV_COUNT is initialized by evaluating the expression {([117*INTERVAL_LENGTH)/60}.

At step 318 various messages and the real time are displayed on display 166. The text for the message is stored in appropriate locations in the EPROM 148, while the correct real time is obtained from the programmable real time clock 154.

Step 324 depicts the commencement of a loop which is respectively executed by the microcontroller 142 in conjunction with the program MAIN_LOOP. During its execution, the program MAIN_LOOP can be interrupted by a signal applied by the programmable real time clock 154 to pin 12 (INTO) of the microcontroller 142. Such an interrupt occurs once per second and results in a call to execute the procedure RTC_INTERRUPT.

Figure 7:
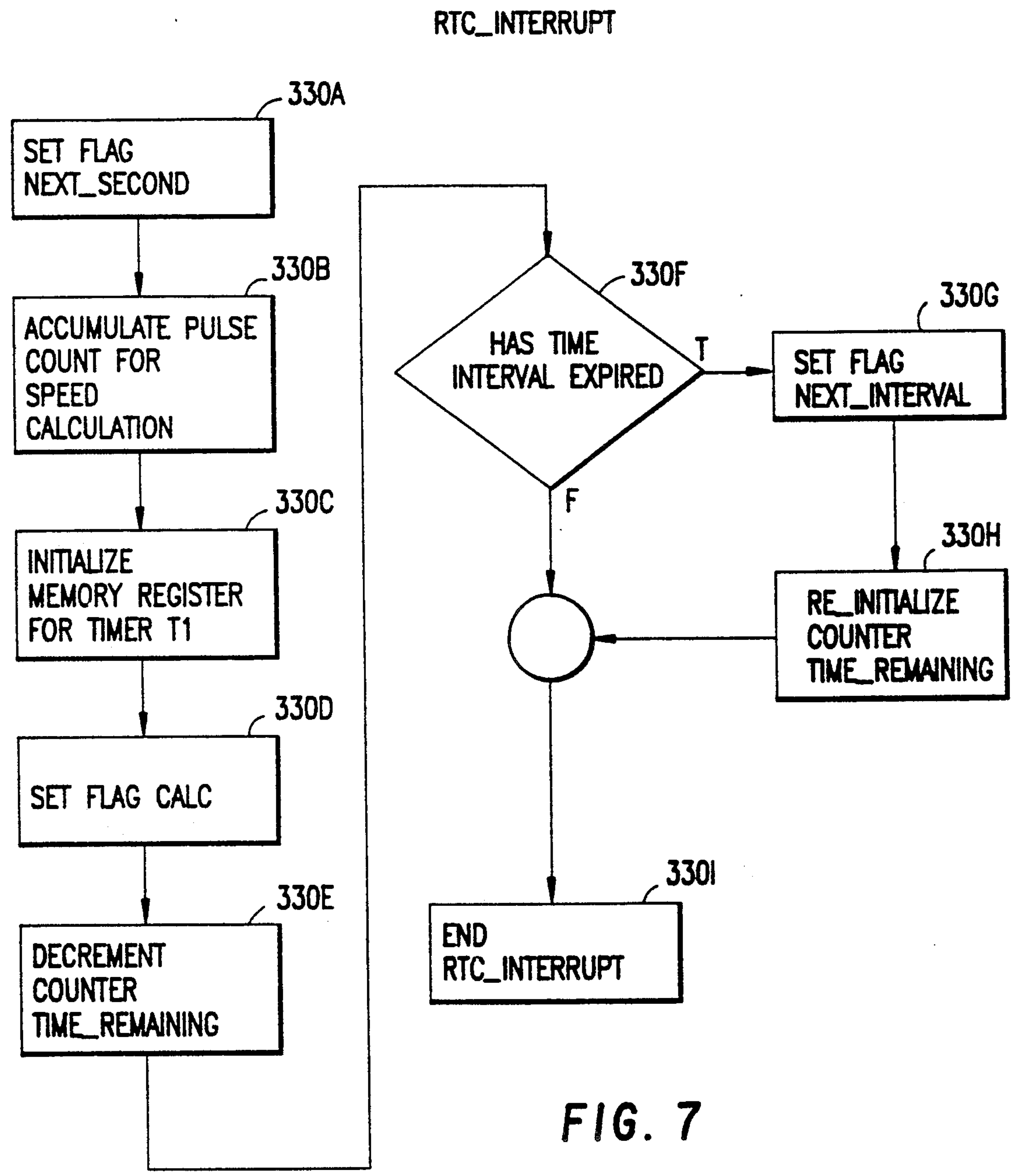
FIG. 7 is a schematic diagram depicting steps executed in a procedure RTC_INTERRUPT.

Steps performed as a result of the execution of the procedure RTC_INTERRUPT are depicted in FIG. 7. Inasmuch as the programmable real time clock 154 generates, at the step 330A the flag NEXT_SECOND is set to indicate the commencement of a new second.

At step 330B, the contents of the registers associated with the timer T1 of the microcontroller 142 are stored in locations COUNTER_HIGH and COUNTER_LOW. The content of the locations COUNTER_HIGH and COUNTER_LOW will thus represent the number of pulses received on line 132 from the rotational position sensor 116 which, as indicated before, is indicative of the machine cycle speed. At step 330C, the memory register that is associated with the timer T1 of the microcontroller 142 is initialized at zero.

At step 330D the flag CALC is set in order to enable the performance of certain calculations as described hereinafter.

At step 330E the time left in the current observation interval is determined. This is done by decrimenting the contents of the counter TIME_REMAINING. At step 330F a determination is made as to whether the current observation interval has just expired, i.e. if the value in the counter TIME_REMAINING has been decremented to zero. If it is determined at step 330F that the current observation time interval has expired, the flag NEXT_INTERVAL is set at step 330G to indicate that a new observation time interval has begun. Moreover, at step 330H the value in counter TIME_REMAINING is reinitalized to the value stored in location INTERVAL_LENGTH.

Upon the determination of a negative result of the decision associated with step 330F, or alternatively upon the completion of step 330H, the procedure is terminated at step 300I.

At step 346 an ASCII representation of the current per-hour cycle speed is written on the display 166. Thereafter at step 348 the current time as ascertained from the programmable real time clock 154 is written on the display 166.

At step 350 the logical flag NEXT_INTERVAL is evaluated. If the flag NEXT_INTERVAL has been set to a TRUE value (as by step 330G of the procedure RTC_INTERRUPT), the even numbered steps 352 through 376 of FIG. 4 are executed prior to executing step 378. Otherwise, if the logical flag NEXT_INTERVAL is not true, step 378 is next performed.

At step 352, the IDEAL_THROUGHPUT of the insertion machine at the current speed is calculated. The IDEAL_THROUGHPUT is current machine cycle speed of the machine, which is stored in the location SPEED (see step 344).

At step 354 the ACTUAL_THROUGHPUT of the machine is calculated. This is done by multiplying the PRODUCTIVITY INDEX by a fraction whose numerator is the IDEAL_THROUGHPUT at current speed (obtained at step 352) and whose denominator is 100. Generally the PRODUCTIVITY INDEX utilized in the calculation at step 364 has been obtained at a yet-described step 366, or is a default value if step 366 has not yet been executed.

At step 356 the per-minute rate of number of sets of documents being successfully enveloped is determined. The determination involves multiplying the contents of location GOOD_ENV_COUNT by 60, and dividing the product by the contents of location INTERVAL_LENGTH. The contents of location GOOD_ENV_COUNT represents the number of successfully enveloped sets of documents detected in the current interval of detectors 74. Upon the detection of each envelope, an interrupt occurs at pin 13 of the microcontroller 42 and the contents of location GOOD_ENV_COUNT is incremented to reflect the detection of a further set. In order to get a per-minute projection of the successfully enveloped sets for this interval, the value in location GOOD_ENV_COUNT is multiplied by 60 and the product is divided by the contents at location INTERVAL_LENGTH.

At step 358 the successful envelope counter GOOD_ENV_COUNT is reinitalized at the value zero. At step 360 the value for location GOOD_ENV_PER_MIN (obtained at step 356) is stored at location PREV_DEMAND. Thus, location PREV_DEMAND contains a value indicative of the number of good sets of documents successfully enveloped per minute during this interval.

At step 362 a "new forecast" is computed and stored in location NEW_FORECAST. The value calculated for storage in location NEW_FORECAST is obtained by evaluating the expression (((100-K_FACTOR)*PREV_FORECAST)+(K_FACTOR*PREV_DEMAND)). In accordance with the expression, the weighted value of an accumulatively averaged number of sets of documents successfully enveloped for a unit of time (stored in location PREV_FORECAST) has added thereto a complementary-weighted number representative of the number of sets of documents successfully enveloped for the same unit of time during the most recent interval. The weighting factor is stored in location K_FACTOR and is determined from the setting on switch 169. The weighting factor thus serves as an exponential smoothing factor.

At step 364 the NEW_FORECAST is expressed in a second unit of time (the number of envelopes per hour). In the illustrated embodiment, expression in the units of envelopes per hour is obtained by dividing the results of step 362 by 100 and then multiplying the quotient by 60 and storing the result in location ENV_PER_HR.

At step 366 the percentage productivity index (PPI) is calculated. The percentage productivity index (PPI) is obtained by dividing the result of a calculation of step 364 (i.e., the contents of location. ENV_PER_HR) by a fraction whose numerator is the contents of location SPEED and whose denominator is the value 100.

At step 368 the value of location PREV_FORECAST is updated to reflect statistics accumulated during the most recent interval. In this regard, the value presently stored in location NEW_FORECAST is divided by 100 and stored in location PREV_FORECAST.

At step 370 the percentage productivity index (PPI) (earlier calculated at step 366) is divided by a percentage operating speed to determine whether the actual machine cycling speed should be changed to result in a greater actual throughput of successfully enveloped sets of documents. In this regard, the percentage productivity index (PPI) is divided by a factor whose numerator is the actual machine cycle speed (obtained from the location SPEED) and whose denominator is a value indicative of a maximum rated machine cycle speed (MAX_RATE) for that particular machine (for example, 12,500 cycles per hour).

At step 372 a call is made to procedure AUTO_SPEED. Procedure AUTO_SPEED is utilized to automatically adjust the cycling speed of the insertion machine in accordance with the rationale previously provided with respect to FIG. 10. The steps associated with procedure AUTO_SPEED are depicted in FIG. 9 as including substeps 372A-372J.

At step 372A of procedure AUTO_SPEED, the value at location PERCENT_SPEED (obtained at step 345) is compared with the percentage productivity index or PPI (calculated at step 366). If PERCENT_SPEED exceeds PPI, the operating speed is too high and should be decreased to get increased actual throughput. Accordingly, steps 372B and 372C are executed to store the value obtained from the subtraction PERCENT_SPEED−PPI at the location DIFFERENCE (step 372B) and to set logical flag NEED_SPEED=SLOWER (step 372C). On the other hand, if PPI exceeds PERCENT_SPEED, the operating speed can be further increased to increase actual throughput. To this end, the value obtained from the subtraction PPI−-PERCENT_SPEED is stored at location DIFFERENCE (step 372D), and logical flag NEED_SPEED is set to FASTER (step 372E).

In order to control the size of the incremental changes in the machine cycling speed, at step 372F a test is conducted to determine whether the value at location DIFFERENCE (whether computed at step 372B or 372D) exceeds a predetermined limit MAX_DIFF. In the event of such an excess, the location DIFFERENCE is set at the limit MAX_DIFF (step 372G).

Inasmuch as changes in machine cycling speed are implemented using the speed adjustment servomechanism 136, and inasmuch as the servomechanism 136 utilizes a pulse width signal modulated in accordance with a factor PW_FACTOR, the procedure AUTO_SPEED calculates the value for PW_FACTOR. If the machine speed should be slowed (determined at step 372H), the previous value of PW_FACTOR has the value DIFFERENCE subtracted therefrom (step 372I) to obtain a new PW_FACTOR. If the machine speed should be increased, the value DIFFERENCE is added to the previous value of PW_FACTOR to obtain a new PW_FACTOR value (step 372J).

At step 374 the value of PPI is written to the display 166.

At step 376 the logical flag NEXT_INTERVAL is set FALSE so that even numbered steps 352 through 376 will not be again executed until the newly commenced interval has expired. The newly commenced interval will not expire until an appropriate number of interrupts has been received from the programmable real time clock 154 (as seen with reference to steps 330F through 330H of FIG. 7).

Whenever the Timer TO included in the controller 142 times out, the procedure MS_TIMER is called. Steps associated with the procedure MS_TIMER are shown in FIG. 8. The procedure MS_TIMER is used to compute the desired pulse width of the signal applied in line 199 to the speed adjustment servomechanism 136.

At step 390 of FIG. 8, the time TO (having a period of 20 milliseconds) is stopped so that the calculation of step 392 can be made. At step 392 the procedure Ms_TIMER uses the value in location PW_FACTOR (which ranges from 0 to 100) to modulate the width of the pulse applied on line 199 in a range from 0.5 milliseconds to 2.5 milliseconds. As mentioned above, with a pulse width of 0.5 milliseconds the output shaft of the servomechanism 136 has an orientation of −90 degrees; at 2.5 milliseconds the output shaft of the servomechanism 136 has an orientation of +90 degrees. At step 394 the timer T0 is again started, so that the pulse width modulated signal calculated at step 392 is applied on line 199 to the servomechanism 136.

For illustrative purposes, assume that the loop including steps 340 through 376 is being repetitively executed and the various memory locations have the values of the following Table 1:

TABLE 1

| |
|---|
| PREV_FORECASE = 130 |
| K_FACTOR = 10 |
| INTERVAL_LENGTH = 5 |
| TIME_REMAINING = 1 |
| SPEED = 192 |
| PPI = 70.00 |
| GOOD_ENV_COUNT = 10 |

Assume further that an interrupt generated by the real time clock 154 is applied to the microcontroller 142. The interrupt results in execution of the procedure RTC_INTERRUPT which inter alia sets the flag NEXT_SECOND and CALC (steps 330A and 330D). Moreover, at step 330E the counter TIME_REMAINING is decremented and left with a zero value. As a result of the zero value in counter TIME_REMAINING, the logical flag NEXT_INTERVAL is set false (step 330G) and the counter TIME_REMAINING is reinitalized to the value in location INTERVAL_LENTGH (step 330H). As the result of the setting of flag NEXT_SECOND and the flag CALC, step 344 is performed so that the machine cycle speed can be calculated. Inasmuch as the value stored at location SPEED for the last second was 192, it is understood that the 64-toothed disc 118 is rotating three times a second, or alternatively 10,800 cycles per hour.

In view of the fact that the logical flag TIME_INTERVAL was set true at step 330G, even numbered steps 352 through 376 are performed. The results of each step are indicated on Table 2 below:

TABLE 2

| | |
|---|---|
| (STEP 352) | IDEAL THROUGHPUT (ITP) = 10,800 |
| (STEP 354) | ACTUAL THROUGHPUT (ATP) = 7560 |
| (STEP 356) | GOOD_ENV_PER_MIN = 120 |
| (STEP 358) | GOOD_ENV_COUNT = 0 |
| (STEP 360) | PREV_DEMAND = 120 |
| (STEP 362) | NEW_FORCAST = 12900 |
| (STEP 364) | ENV_PER_HR = 7740 |
| (STEP 366) | PERCENT PRODUCTIVITY INDEX (PPI) = 71.67 |
| (STEP 368) | PREV_FORECAST = 129 |
| (STEP 370) | PPI = 71.67 (POS) = 86.40 |

Thus, with reference to step 370, it is seen that the percentage productivity index (PPI) is computed to be 71.67, which is less than the value of 86.40 computed for the percentage operating speed. Hence, in order to obtain an optimum operating speed for the present circumstances, it is determined that the operating speed of the machine should be decreased.

At step 372 the procedure AUTO_SPEED is called, and substeps 372B, 372C, 372F, 372H, and 372I are executed. At substep 372B a value of 14.73 is computed for location DIFFERENCE. If it is assumed for the present illustration that the value in location DIFFERENCE is less than the value in location MAX_DIFF, a new value of 71.67 is calculated at substep 372I for location PW_FACTOR (assuming the previous value of PW_FACTOR to be 86.40).

Upon the next execution of procedure MS_TIMER, which occurs when timer T0 next times out, the new value of PW_FACTOR, computed at step 372I of procedure AUTO_SPEED, is used to change the pulse width of the signal applied on line 199 to the servomechanism 136. With the value of PW_FACTOR being 71.67 width of the pulse on line 199 is 1.93 milliseconds. Upon receiving a signal having pulse width of 1.93 milliseconds, the output shaft of the servomechanism 136 becomes oriented at 39 degrees. At this orientation, the insertion machine will have a speed of about 9000 cycles per hour.

Thus, for the next interval the operating speed of the machine is decreased to 9,000 cycles per hour. Further, assume that the value in location GOOD_ENV_COUNT is 11 at the end of the next five second interval. The end of the five second interval will be determined in the manner described above with reference to the procedure RTC_INTERRUPT (see FIG. 7). Inasmuch as the procedure RTC_INTERRUPT has set the flag NEXT_SECOND and the value of the logical flag NEXT_INTERVAL to be TRUE, steps 352 through 376 of FIG. 4 are performed with the following results:

TABLE 3

| | |
|---|---|
| (STEP 352) | IDEAL THROUGHPUT (ITP) = 9,000 |
| (STEP 354) | ACTUAL THROUGHPUT (ATP) = 6450.3 |
| (STEP 356) | GOOD_ENV_PER_MIN = 132 |
| (STEP 358) | GOOD_ENV_COUNT = 0 |
| (STEP 360) | PREV_DEMAND = 132 |
| (STEP 362) | NEW_FORCAST = 12930 |
| (STEP 364) | ENV_PER_HR = 7758 |
| (STEP 366) | PERCENT PRODUCTIVITY INDEX (PPI) = 86.2 |
| (STEP 368) | PREV_FORECAST = 129.30 |
| (STEP 370) | PPI = 86.2 72.00 (POS) |

Thus, at step 370, it is seen that the percent productivity index PPI is computed to be 86.2, which is greater than the value 72.00 computed for the percentage operating speed. With a percent productivity index of 86.2 and a machine cycle speed of 9,000, the ACTUAL_THROUGHPUT per hour will not be 7758, which exceeds an ACTUAL_THROUGHPUT projection of 7740.36 (which would have occurred if the operating speed not been reduced from 10,800 cycles per hour to 9,000 cycles per hour).

While the invention has been particularly shown and described with reference to the preferred embodiments thereof, it will be understood by those skilled in the art that various alterations in form and detailed may be made therein without departing from the spirit and scope of the invention. For example, there are other ways to interface the speed optimization circuit 140 of the invention to the speed adjustment mechanism of the insertion machine. For instance, the circuit 140 can output a signal from the serial port of the microcontroller 142, or from the programmable peripheral interface 156, to the insertion machine.

The embodiments of the invention in which an exclusive property or privilege is claimed are defined as follows:

1. A method of operating a machine of the type which performs functions in accordance with a machine cycle, said method comprising the steps of:

(a) commencing operation of said machine whereby said machine repeatedly performs a processing event;

(b) establishing a time interval whereby, for each of a plurality of successive such time intervals, the performance of said machine can be evaluated;

(c) establishing a weighing factor for weighting information obtained with respect to said most recent interval relative to information accumulatively averaged over preceding time intervals;

(d) determining an actual machine cycle speed;

(e) determining, for a most recent time interval, an indication of the number of repetitions of said processing event said machine can be expected to successfully perform during a unit of time;

(f) developing a new forecast of the projected number of sets of repetitions of said processing event said machine is expected to successfully perform during said unit of time by averaging said indication determined in step (e) with a previous forecast, said previous forecast being either:

(i) an accumulatively averaged number of the number of successful repetitions of said processing event performed for a unit of time during previous intervals; or, (ii) upon commencement of said machine, a predetermined default value;

(g) determining a percentage productivity index by dividing said new forecast by said actual machine cycle speed;

(h) representing said actual machine cycle speed as a percentage value indicative of a maximum rated machine cycle speed; and, (i) comparing said percentage productivity index obtained in step (g) with the percentage obtained in step (h) to determine whether the actual machine cycling speed should be changed to result in a greater actual number of successful repetitions of said processing event.

2. The method of claim 1, further comprising the step of:

adjusting said actual machine cycle speed in accordance with the result of comparison of step (i).

3. The method of claim 1, wherein said actual machine cycle speed is increased if said productivity index obtained in step (g) is greater than said percentage obtained in step (h).

4. The method of claim 2, wherein said actual machine cycle speed is decreased if said productivity index obtained in step (g) is less than said percentage obtained in step (h).

5. The method of step 2, wherein said adjustment is automatic.

6. The method of claim 1, further comprising the steps of:

(j) using said new forecast as said previous forecast; and (k) repeating steps (d) through (i) for a next interval.

7. A method of operating a machine comprising the steps of:

(a) commencing operation of said machine whereby said machine repeatedly performs a processing event;

(b) determining a rate at which said machine performs said processing event;

(c) determining an indication of the number of repetitions of said processing event said machine can perform during a unit of time;

(d) using said determination of steps (b) and (c) to determine whether the rate at which said machine performs said processing event should be changed to result in a greater number of successfully performed processing events during a unit of time; and, (e) automatically changing said rate at which said machine performs said processing event in accordance with the determination of step (d).

* * * * *